(12) United States Patent
Kim et al.

(10) Patent No.: US 12,269,081 B2
(45) Date of Patent: Apr. 8, 2025

(54) PLATED STEEL SHEETS FOR HOT PRESS FORMING HAVING EXCELLENT HYDROGEN BRITTLENESS RESISTANCE AND IMPACT RESISTANCE, HOT PRESS FORMED PARTS, AND MANUFACTURING METHODS THEREOF

(71) Applicant: POSCO Co., Ltd, Pohang-si (KR)

(72) Inventors: Sang-Heon Kim, Gwangyang-si (KR); Jin-Keun Oh, Gwangyang-si (KR); Seong-Woo Kim, Gwangyang-si (KR); Sang-Bin Han, Gwangyang-si (KR)

(73) Assignee: POSCO CO., LTD, Gyeongsangbuk-Do (KR)

( * ) Notice: Subject to any disclaimer, the term of this patent is extended or adjusted under 35 U.S.C. 154(b) by 76 days.

(21) Appl. No.: 18/019,639

(22) PCT Filed: Oct. 19, 2021

(86) PCT No.: PCT/KR2021/014586
§ 371 (c)(1),
(2) Date: Feb. 3, 2023

(87) PCT Pub. No.: WO2022/097965
PCT Pub. Date: May 12, 2022

(65) Prior Publication Data
US 2023/0286030 A1    Sep. 14, 2023

(30) Foreign Application Priority Data
Nov. 9, 2020 (KR) .................. 10-2020-0148753

(51) Int. Cl.
*C22C 38/02* (2006.01)
*B21D 22/02* (2006.01)
(Continued)

(52) U.S. Cl.
CPC .......... *B21D 22/022* (2013.01); *B32B 15/012* (2013.01); *C21D 6/002* (2013.01);
(Continued)

(58) Field of Classification Search
CPC ..... B32B 15/011; C22C 38/001; C22C 38/02; C22C 38/06; C22C 38/18
See application file for complete search history.

(56) References Cited

U.S. PATENT DOCUMENTS

| | | | |
|---|---|---|---|
| 6,296,805 | B1 | 10/2001 | Laurent et al. |
| 2012/0216925 | A1 | 8/2012 | Kobayashi et al. |

(Continued)

FOREIGN PATENT DOCUMENTS

| | | |
|---|---|---|
| EP | 2808411 A1 | 12/2014 |
| EP | 3231887 A1 | 10/2017 |

(Continued)

OTHER PUBLICATIONS

International Search Report dated Jan. 11, 2022 issued in International Patent Application No. PCT/KR2021/014586 (with English translation).

(Continued)

*Primary Examiner* — Adam Krupicka
(74) *Attorney, Agent, or Firm* — Morgan, Lewis & Bockius LLP (57) ABSTRACT

Provided are a plated steel sheet for hot press forming including: a base steel sheet containing, by wt %, 0.14 to 0.5% of C, 0.001 to 1% of Si, 0.3 to 4% of Mn, 0.001 to 0.015% of P, 0.0001 to 0.02% of S, 0.001 to 0.1% of Al, 0.001 to 1% of Cr, 0.001 to 0.02% of N, 0.1% or less of Ti, 0.01% or less of B, 0.005 to 0.1% of Sb, and a balance of Fe and unavoidable impurities; an aluminum or aluminum alloy plating layer provided on at least one surface of the
(Continued)

base steel sheet; and a Sb-rich layer provided between the base steel sheet and the plating layer, wherein the plated steel sheet for hot press forming satisfies the following Relational Expressions 1-1 and 1-2, a hot press formed member manufactured using the same, and methods for manufacturing the plated steel sheet for hot press forming and the hot press formed member.

[Relational Expression 1-1]

$$\frac{Sb_{max}}{Sb_{coat}} \geq 1.2$$

[Relational Expression 1-2]

$$\frac{(Sb_{max} - Sb_{coat})}{2} \times \Delta t \geq 0.008$$

[In Relational Expressions 1-1 and 1-2, $Sb_{coat}$ represents an average content of Sb in the plating layer, and a unit thereof is wt %, $Sb_{max}$ represents a maximum value of a content of Sb in the Sb-rich layer, and a unit thereof is wt %, and $\Delta t$ represents a linear distance from a boundary between the plating layer and the Sb-rich layer to a point where $Sb_{max}$ is measured, and a unit thereof is µm.]

4 Claims, 4 Drawing Sheets

(51) Int. Cl.
| | | |
|---|---|---|
| *B32B 15/01* | (2006.01) | |
| *C21D 6/00* | (2006.01) | |
| *C21D 8/02* | (2006.01) | |
| *C21D 9/00* | (2006.01) | |
| *C21D 9/46* | (2006.01) | |
| *C22C 33/04* | (2006.01) | |
| *C22C 38/00* | (2006.01) | |
| *C22C 38/04* | (2006.01) | |
| *C22C 38/06* | (2006.01) | |
| *C22C 38/28* | (2006.01) | |
| *C22C 38/32* | (2006.01) | |
| *C22C 38/38* | (2006.01) | |
| *C22C 38/60* | (2006.01) | |
| *C23C 2/02* | (2006.01) | |

(52) U.S. Cl.
CPC .............. *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0278* (2013.01); *C21D 9/0081* (2013.01); *C21D 9/46* (2013.01); *C22C 33/04* (2013.01); *C22C 38/001* (2013.01); *C22C 38/002* (2013.01); *C22C 38/02* (2013.01); *C22C 38/04* (2013.01); *C22C 38/06* (2013.01); *C22C 38/28* (2013.01); *C22C 38/32* (2013.01); *C22C 38/38* (2013.01); *C22C 38/60* (2013.01); *C23C 2/02* (2013.01); *C23C 2/022* (2022.08); *C23C 2/0224* (2022.08); *C23C 2/024* (2022.08)

(56) References Cited

U.S. PATENT DOCUMENTS

| | | |
|---|---|---|
| 2017/0369974 A1 | 12/2017 | Kim et al. |
| 2018/0037964 A1 | 2/2018 | Murata et al. |
| 2018/0100213 A1 | 4/2018 | Tanaka et al. |
| 2019/0003029 A1 | 1/2019 | Oh et al. |

FOREIGN PATENT DOCUMENTS

| | | |
|---|---|---|
| EP | 3396010 A1 | 10/2018 |
| EP | 3889315 A1 | 10/2021 |
| EP | 2695963 B1 | 11/2021 |
| EP | 3951012 A1 | 2/2022 |
| JP | 2012-041597 A | 3/2012 |
| JP | 2012-41610 A | 3/2012 |
| JP | 2012-112010 A | 6/2012 |
| JP | 2012-177190 A | 9/2012 |
| JP | 2019-506523 A | 3/2019 |
| JP | 2020-122202 A | 8/2020 |
| KR | 10-2004-0055332 A | 6/2004 |
| KR | 10-2011-0062899 A | 6/2011 |
| KR | 10-2012-0035940 A | 4/2012 |
| KR | 10-2015-0074951 A | 7/2015 |
| KR | 10-2016-0015388 A | 2/2016 |
| KR | 10-1630976 B1 | 6/2016 |
| KR | 10-2016-0077538 A | 7/2016 |
| KR | 10-2017-0131606 A | 11/2017 |
| KR | 10-2046544 B1 | 11/2019 |
| KR | 10-2020-0066238 A | 6/2020 |
| WO | 2019/111931 A1 | 6/2019 |
| WO | 2020/011911 A1 | 1/2020 |
| WO | 2020/203979 A1 | 10/2020 |

OTHER PUBLICATIONS

Extended European Search Report issued Mar. 11, 2024 for European Patent Application No. 21889430.1.
Office Action issued Mar. 26, 2024 for Japanese Patent Application No. 2023-507453.

PLATED STEEL SHEETS FOR HOT PRESS FORMING HAVING EXCELLENT HYDROGEN BRITTLENESS RESISTANCE AND IMPACT RESISTANCE, HOT PRESS FORMED PARTS, AND MANUFACTURING METHODS THEREOF

CROSS-REFERENCE OF RELATED APPLICATIONS

This application is the U.S. National Phase under 35 U.S.C. § 371 of International Patent Application No. PCT/KR2021/014586, filed on Oct. 19, 2021, which in turn claims the benefit of Korean Application No. 10-2020-0148753, filed on Nov. 9, 2020, the entire disclosures of which applications are incorporated by reference herein.

TECHNICAL FIELD

The present disclosure relates to a plated steel sheet for hot press forming having excellent hydrogen brittleness resistance and impact resistance, a hot press formed member, and methods for manufacturing the plated steel sheet for hot press forming and the hot press formed member.

BACKGROUND ART

Recently, a hot press formed member has been mainly applied to an automobile structural member to achieve improvement of fuel efficiency, protection of passengers, and the like, through weight reduction of an automobile. In particular, the hot press formed member may be used for a bumper, a door, a pillar reinforcement, and the like that require ultra-high strength or high energy absorption capacity, and a representative example of such a hot press forming technique includes U.S. Pat. No. 6,296,805 (hereinafter, referred to as Patent Document 1).

In Patent Document 1, an Al—Si-based plated steel sheet is heated to 850° C. or higher, and then hot press forming and quenching are performed to form a structure of a member into martensite, such that ultra-high strength with high tensile strength may be secured. In a case in which such ultra-high strength steel for hot press forming is applied, a complex shape may easily be formed because the forming is performed at a high temperature, and a weight reduction effect may be expected through an increase in strength by quenching in a mold. However, a martensite structure is known to have low resistance to hydrogen brittleness, and in particular, the hot press formed member has a residual stress due to quenching after heating. Therefore, when the amount of diffusible hydrogen in steel is increased, delayed fracture due to hydrogen brittleness may occur, and thus, the steel is limited in application for a member.

In addition, changes in process parameters may lead to global or local changes in mechanical properties in the sheet. Therefore, a steel composition that is less sensitive to changes in manufacturing parameters for manufacturing a plated steel sheet and a hot press formed member having excellent mechanical properties and homogeneity has been demanded, and prevention of delayed fracture due to hydrogen brittleness has been required. However, a technique that may meet all these demands has not been developed.

(Patent Document 1) U.S. Pat. No. 6,296,805

DISCLOSURE

Technical Problem

An aspect of the present disclosure is to provide a plated steel sheet for hot press forming having excellent hydrogen brittleness resistance and impact resistance, a hot press formed member, and methods for manufacturing the plated steel sheet for hot press forming and the hot press formed member.

An object of the present disclosure is not limited to the above description. The object of the present disclosure will be understood from the general contents of the present specification, and those skilled in the art to which the present disclosure pertains will have no difficulties in understanding the additional objects of the present disclosure.

Technical Solution

According to an aspect of the present disclosure, a plated steel sheet for hot press forming includes:
a base steel sheet containing, by wt %, 0.14 to 0.5% of C, 0.001 to 1% of Si, 0.3 to 4% of Mn, 0.001 to 0.015% of P, 0.0001 to 0.02% of S, 0.001 to 0.1% of Al, 0.001 to 1% of Cr, 0.001 to 0.02% of N, 0.1% or less of Ti, 0.01% or less of B, 0.005 to 0.1% of Sb, and a balance of Fe and unavoidable impurities;
an aluminum or aluminum alloy plating layer provided on at least one surface of the base steel sheet; and
a Sb-rich layer provided between the base steel sheet and the plating layer,
wherein the plated steel sheet for hot press forming satisfies the following Relational Expressions 1-1 and 1-2:

[Relational Expression 1-1]

$$\frac{Sb_{max}}{Sb_{coat}} \geq 1.2$$

[Relational Expression 1-2]

$$\frac{(Sb_{max} - Sb_{coat})}{2} \times \Delta t \geq 0.008$$

[in Relational Expressions 1-1 and 1-2, $Sb_{coat}$ represents an average content of Sb in the plating layer, and a unit thereof is wt %, $Sb_{max}$ represents a maximum value of a content of Sb in the Sb-rich layer, and a unit thereof is wt %, and $\Delta t$ represents a linear distance from a boundary between the plating layer and the Sb-rich layer to a point where $Sb_{max}$ is measured, and a unit thereof is μm].

According to another aspect of the present disclosure, a method for manufacturing a plated steel sheet for hot press forming includes:
reheating a steel slab containing, by wt %, 0.14 to 0.5% of C, 0.001 to 1% of Si, 0.3 to 4% of Mn, 0.001 to 0.015% of P, 0.0001 to 0.02% of S, 0.001 to 0.1% of Al, 0.001 to 1% of Cr, 0.001 to 0.02% of N, 0.1% or less of Ti, 0.01% or less of B, 0.005 to 0.1% of Sb, and a balance of Fe and unavoidable impurities to 1,050 to 1,300° C.;
finish rolling the heated steel slab at 800 to 950° C. to obtain a hot-rolled steel sheet;
coiling the hot-rolled steel sheet at 500 to 700° C.;
pickling the coiled hot-rolled steel sheet so that a product of an acid concentration and a pickling time is 800 to 10,000 g/L*s;

annealing the pickled steel sheet at 700 to 900° C. under a dew point temperature condition of −75 to +20° C. in a furnace; and after the annealing, plating the steel sheet by passing the steel sheet through a plating bath formed of aluminum or an aluminum alloy.

According to still another aspect of the present disclosure, a hot press formed member includes:

a base steel sheet containing, by wt %, 0.14 to 0.5% of C, 0.001 to 1% of Si, 0.3 to 4% of Mn, 0.001 to 0.015% of P, 0.0001 to 0.02% of S, 0.001 to 0.1% of Al, 0.001 to 1% of Cr, 0.001 to 0.02% of N, 0.1% or less of Ti, 0.01% or less of B, 0.005 to 0.1% of Sb, and a balance of Fe and unavoidable impurities;

an aluminum or aluminum alloy plating layer provided on at least one surface of the base steel sheet; and a Sb-rich layer provided between the base steel sheet and the plating layer, wherein the hot press formed member satisfies the following Relational Expressions 2-1 and 2-2:

[Relational Expression 2-1]

$$\frac{Sb_{max}}{Sb_{coat}} \geq 1.5$$

[Relational Expression 2-2]

$$\frac{(Sb_{max} - Sb_{coat})}{2} \times \Delta t \geq 0.01$$

[in Relational Expressions 2-1 and 2-2, $Sb_{coat}$ represents an average content of Sb in the plating layer, and a unit thereof is wt %, $Sb_{max}$ represents a maximum value of a content of Sb in the Sb-rich layer, and a unit thereof is wt %, and $\Delta t$ represents a linear distance from a boundary between the plating layer and the Sb-rich layer to a point where $Sb_{max}$ is measured, and a unit thereof is μm].

According to still another aspect of the present disclosure, a method for manufacturing a hot press formed member includes:

subjecting the plated steel sheet for hot press forming manufactured by the method for manufacturing a plated steel sheet for hot press forming to a heat treatment in a temperature range of Ac3 to 950° C. for 1 to 1,000 seconds and then hot press forming the heat-treated plated steel sheet for hot press forming.

Advantageous Effects

As set forth above, according to an aspect of the present disclosure, it is possible to provide a plated steel sheet for hot press forming that has excellent hydrogen brittleness resistance and impact resistance because the amount of diffusible hydrogen in steel is reduced by manufacturing a plated steel sheet in which a Sb-rich layer is preserved between a base steel sheet and a plating layer, a hot press formed member, and methods for manufacturing the plated steel sheet for hot press forming and the hot press formed member.

The various and beneficial advantages and effects of the present disclosure are not limited to the above description, and may be more easily understood in the description of specific exemplary embodiments in the present disclosure.

BEST MODE FOR INVENTION

Hereinafter, preferred exemplary embodiments in the present disclosure will be described. However, the exemplary embodiments in the present disclosure may be modified in many different forms and the scope of the present disclosure is not limited to exemplary embodiments described below. In addition, the exemplary embodiments in the present disclosure are provided to further completely describe the present disclosure to those skilled in the art.

Since diffusible hydrogen at grain boundaries is a cause of accelerating cracks at the grain boundaries when stress occurs, a method for reducing the amount of diffusible hydrogen in steel after hot stamping is required.

Therefore, the present inventors have analyzed the effects of various elements including Sb addition, manufacturing conditions, a structure, and the like in a steel material for hot press forming by analyzing the amount of diffusible hydrogen in steel, which is an index that indicates a hydrogen brittleness resistance effect well, and calculating an area (crack initiation energy (CIE)) until the maximum load is reached in a test (VDA238-100) of three-point bending, which is one of indices that may indicate impact resistance. The present inventors have found through this that the amount of diffusible hydrogen may be reduced by forming a Sb-rich layer, and have devised a plated steel sheet for hot press forming having both excellent hydrogen brittleness resistance and impact resistance, a hot press formed member, and methods for manufacturing the plated steel sheet for hot press forming and the hot press formed member.

Hereinafter, first, a plated steel sheet for hot press forming and a hot press formed member according to an aspect of the present disclosure will be described in detail.

A plated steel sheet according to an aspect of the present disclosure includes: a base steel sheet containing, by wt %, 0.14 to 0.5% of C, 0.001 to 1% of Si, 0.3 to 4% of Mn, 0.001 to 0.015% of P, 0.0001 to 0.02% of S, 0.001 to 0.1% of Al, 0.001 to 1% of Cr, 0.001 to 0.02% of N, 0.1% or less of Ti, 0.01% or less of B, 0.005 to 0.1% of Sb, and a balance of Fe and unavoidable impurities; an aluminum or aluminum alloy plating layer provided on at least one surface of the base steel sheet; and a Sb-rich layer provided between the base steel sheet and the plating layer.

First, an alloy composition of the base steel sheet of the present disclosure will be described in detail. In the present disclosure, it should be noted that a content of each element means wt % unless otherwise specified.

Carbon (C): 0.14 to 0.5%

C is an element that increases strength of a heat-treated member and improves hardenability, and should be appropriately added as an essential element for controlling the strength. When a content of C is less than 0.14%, since the hardenability is low, when a cooling rate is reduced, sufficient martensite is not secured and ferrite is formed, which causes deterioration of impact resistance. Therefore, C should be added in an amount of 0.14% or more. On the other hand, when the content of C exceeds 0.5%, the strength is excessively increased, brittleness may be caused, and weldability is deteriorated. Therefore, an upper limit thereof is preferably 0.5% or less. Alternatively, more preferably, a lower limit of the content of C may be 0.147%, and more preferably, the upper limit of the content of C may be 0.335%.

Silicon (Si): 0.001 to 1%

Si should be added as a deoxidizing agent in steelmaking, and is a solid solution strengthening element and a carbide formation suppressing element. Therefore, Si is an element effective in uniformizing an internal structure, and is added as an element contributing to an increase in strength of the hot press formed member and is effective in uniformizing a material. However, when a content of Si is less than 0.001%, the above effect may not be expected, and manufacturing costs and a process cost for controlling the content of Si are increased, which is not preferable. On the other hand, when the content of Si exceeds 1%, plating properties are significantly deteriorated due to Si oxides excessively formed on a surface of the steel sheet during annealing. Therefore, Si is added in an amount of 1% or less. Alternatively, more preferably, a lower limit of the content of Si may be 0.11%, and more preferably, an upper limit of the content of Si may be 0.81%.

Manganese (Mn): 0.3 to 4%

Mn needs to be added not only to secure desired strength due to a solid solution strengthening effect thereof, but also to suppress formation of ferrite during hot press forming through improvement of hardenability. When a content of Mn is less than 0.3%, it is difficult to obtain a sufficient hardenability effect, and an excessive amount of other expensive alloying elements is required for insufficient hardenability, resulting in a significant increase in manufacturing costs. When the content of Mn exceeds 4%, non-uniformity of an internal structure is caused due to a severe band structure arranged in a rolling direction of a microstructural phase, which may cause deterioration of the impact resistance. Therefore, Mn is added in an amount of 4% or less. Alternatively, more preferably, a lower limit of the content of Mn may be 0.5%, and more preferably, an upper limit of the content of Mn may be 3.7%.

Phosphorus (P): 0.001 to 0.015%

P is present as an impurity in steel, and when a minimum content thereof is less than 0.001%, a high manufacturing cost is required, which is not preferable. However, when a content of P exceeds 0.015%, the weldability of the hot press formed member and the physical properties of the material according to grain boundary segregation at a high temperature are deteriorated. Therefore, an upper limit thereof is set to 0.015%. Alternatively, more preferably, a lower limit of the content of P may be 0.003%, and more preferably, the upper limit of the content of P may be 0.013%.

Sulfur (S): 0.0001 to 0.02%

S is an impurity, and is an element that inhibits ductility, impact properties, and weldability of the member. Therefore, a maximum content thereof is limited to 0.02%. In addition, when a minimum content thereof is less than 0.0001%, the manufacturing cost is significantly increased, which is not preferable. Alternatively, a lower limit of a content of S may be 0.001%, and more preferably, an upper limit of the content of S may be 0.007%.

Aluminum (Al): 0.001 to 0.1%

Al is an element that serves as a deoxidizing agent in steelmaking, together with Si, to increase cleanness of steel. When a content of Al is less than 0.001%, the above effect may not be obtained. When the content thereof exceeds 0.1%, high-temperature ductility is deteriorated due to excessive AlN precipitates formed during a casting process, and slab cracks occur, which may cause problems in manufacturing. Therefore, an upper limit thereof is set to 0.1%. Alternatively, more preferably, a lower limit of the content of Al may be 0.011%, and more preferably, the upper limit of the content of Al may be 0.071%.

Cr: 0.001 to 1%

Similar to Mn, Cr is added as an element for securing the hardenability of the steel and suppressing formation of ferrite after hot press forming. When a content of Cr is less than 0.001%, the above effect may not be secured. On the other hand, when the content of Cr exceeds 1%, the effect of improving hardenability may be insufficient compared to the amount of Cr added, and coarse iron carbides are excessively formed and cracks may occur when stress is applied, which causes deterioration of the material. Therefore, an upper limit thereof is set to 1%. Alternatively, more preferably, a lower limit of the content of Cr may be 0.011%, and more preferably, the upper limit of the content of Cr may be 0.50%.

Nitrogen (N): 0.001 to 0.02%

N is contained in the steel as an impurity. An excessive manufacturing cost is accompanied in order to set a content of N to less than 0.001%, and when the content thereof exceeds 0.02%, slab cracks are easily to occur due to formation of AlN with added Al. Therefore, an upper limit thereof is set to 0.02%. Alternatively, more preferably, a lower limit of the content of N may be 0.0026%, and more preferably, the upper limit of the content of N may be 0.0077%.

Ti: 0.1% or Less (Including 0)

Ti is an element that is optionally added in the present disclosure, and may play a role of protecting B from being a compound for securing hardenability by forming TiN through a combination with nitrogen remaining as an impurity in the steel. In addition, the precipitation strengthening and grain refinement effects may be expected through formation of TiC precipitates. However, when a content thereof exceeds 0.1%, a large amount of coarse TiN is rather formed, which causes deterioration of the material of the steel. Therefore, an upper limit thereof is set to 0.1%. Meanwhile, Ti includes a case in which it is not added as an optional element. Therefore, a lower limit of the content of Ti may be 0%.

B: 0.01% or Less (Including 0)

B is an element that is optionally added in the present disclosure, and is an element capable of effectively improving hardenability. When B is added, B segregates at prior-austenite grain boundaries to suppress brittleness of the hot press formed member caused by grain boundary segregation of impurities of P and/or S. However, when a content of B exceeds 0.01%, an $Fe_{23}CB_6$ composite compound is formed, which may cause brittleness in hot rolling. Therefore, an upper limit thereof is set to 0.01%. Meanwhile, since B is an optional element, B includes a case in which it is not added. Therefore, a lower limit of the content of B may be 0%.

Sb: 0.005 to 0.1%

Sb is a key element in manufacturing the hot press formed member, and forms a Sb-rich layer at an interface between the base steel sheet and the plating layer, thereby reducing a content of hydrogen occluded during a heat treatment and reducing hydrogen delayed fracture susceptibility. When a content of Sb is less than 0.005%, a sufficient concentration layer is not formed at the interface between the plating layer and the base iron, and thus, it is difficult to obtain the effects described above. On the other hand, when the content of Sb exceeds 0.1%, Sb is excessively precipitated at the grain boundary, which causes grain boundary fracture when stress is generated, and as a result, the material is deteriorated. Therefore, an upper limit thereof is preferably set to 0.1%. Alternatively, more preferably, a lower limit of the content of Sb may be 0.006%, and more preferably, an upper limit of the content of Sb may be 0.095%.

The balance other than the elements described above is iron (Fe), and addition of an element is not limited as long as the element may be contained in the steel sheet for hot press forming. In addition, unintended impurities may be inevitably mixed from raw materials or surrounding environments in a general manufacturing process. Therefore, it is difficult to exclude these impurities. Since these impurities may be recognized in the general manufacturing process by those skilled in the art, all the contents thereof are not particularly described in the present specification.

In addition, the plating layer includes an aluminum or aluminum alloy plating layer provided on at least one surface of the base steel sheet. The plating layer provides corrosion resistance in a final hot press formed member.

In the present disclosure, the type of the plating layer is not particularly limited, and any plating layer applied to a conventional plated steel sheet for hot press forming may be applied to the present disclosure without limitation. As an example, the plating layer may be an aluminum or aluminum alloy plating layer, and preferably, the plating layer may contain 6 to 12% of Si, 1 to 4% of Fe, and a balance of Al and unavoidable impurities.

According to an aspect of the present disclosure, the plated steel sheet may include a Sb-rich layer provided between the base steel sheet and the plating layer. In the case, the Sb-rich layer is provided between the base steel sheet and the plating layer, and is a region where Sb is concentrated and classified according to a content of Sb.

Although not particularly limited, according to an exemplary embodiment in the present disclosure, the Sb-rich layer and the plating layer may be distinguished by analyzing a change in content of Sb in a thickness direction from any one point of the plating layer to the base steel sheet using glow discharge optical emission spectrometry (GDS).

Figure 7:
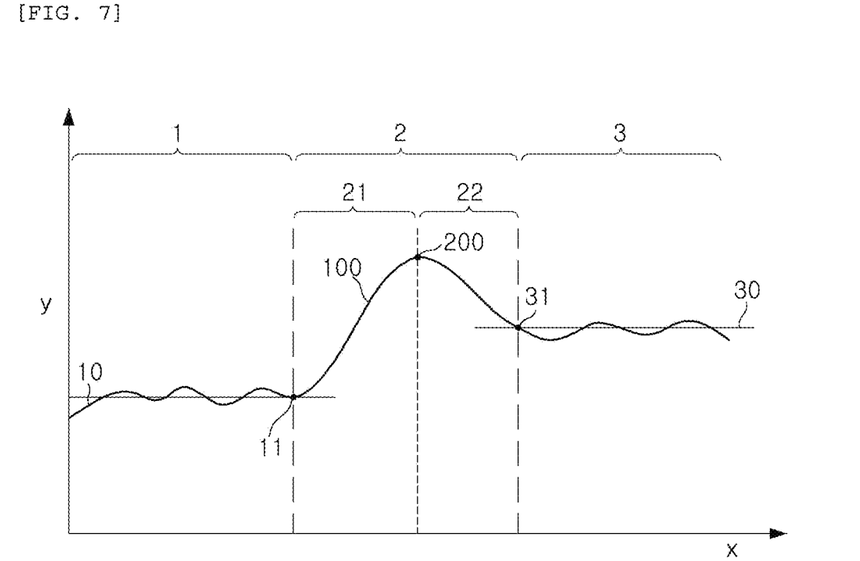
FIG. 7 is an exemplary graph schematically showing a Sb concentration gradient by GDS of the present disclosure.

Specifically, according to an exemplary embodiment in the present disclosure, although not particularly limited, as illustrated in FIG. 7, the Sb-rich layer and the plating layer are determined based on a graph in which an x-axis represents a linear distance from an arbitrary position inside a plating layer 1 in a thickness direction toward a base steel sheet 3, and a y-axis represents a content of Sb measured using the GDS.

For example, based on FIG. 7 schematically illustrating the GDS measurement results described above, a Sb-rich layer 2 is determined from a last contact point 11 of a Sb average content line 10 and a Sb content line 100 measured using the GDS of the plating layer in an x-axis (+) direction (in the thickness direction toward the base steel sheet 3) in a Sb content increase section 21 in the x-axis (+) direction provided in a section 2 between the plating layer 1 and the base steel sheet 3.

In this case, the Sb average content line 10 of the plating layer 1 may refer to an extension line of the Sb average content line for a section from a point spaced apart from a point (200: $Sb_{max}$ point) where the content of Sb is a maximum value in the Sb-rich layer 2 to the plating layer 1 by 15 μm to a point spaced apart from the $Sb_{max}$ point by 20 μm.

Similarly to the method described above, as for the Sb-rich layer 2 and the base steel sheet 3, the Sb-rich layer 2 is determined from a last contact point 31 between a Sb average content line 30 and a Sb content line 100 measured using the GDS of the base steel sheet in an x-axis (−) direction (in the thickness direction toward the plating layer 1) in a Sb content increase section 22 in the x-axis (−) direction provided in the section 2 between the base steel sheet 3 and the plating layer 1 measured using the GDS.

In this case, the Sb average content line 30 of the base steel sheet 3 may refer to an extension line of the Sb average content line for a section from a point spaced apart from a point (200: $Sb_{max}$ point) where the content of Sb is the maximum value in the Sb-rich layer 2 to the base steel sheet 3 by 15 μm to a point spaced apart from the $Sb_{max}$ point by 20 μm.

As a result of conducting intensive studies, the present inventors have found that, during a heat treatment in hot press forming, a reduction in amount of diffusible hydrogen occluded may suppress the occurrence of defects due to hydrogen delayed fracture. Specifically, in a process of heating a blank having a plating layer formed of aluminum or an aluminum alloy during hot press forming, water vapor present in a heat treatment furnace is adsorbed on a surface of the blank. Subsequently, hydrogen generated by dissociation of water is occluded in the steel while having an austenite phase with high hydrogen solubility at a high temperature. However, when rapid cooling by hot press forming occurs and a change into a martensite phase occurs, the solubility of hydrogen is rapidly reduced, an alloy plating layer formed as the plating layer is alloyed serves as an obstacle to prevent hydrogen from being released. Therefore, a significant amount of diffusible hydrogen remains in the steel, thereby increasing the possibility of occurrence of cracks due to hydrogen delayed fracture. Thus, a reduction in amount of diffusible hydrogen occluded during the heat treatment is an important factor for suppressing defects.

Furthermore, as a result of conducting various studies, the present inventors have confirmed that the impact resistance tends to be increased as the hydrogen content in the steel is decreased. This is because the diffusible hydrogen occluded in the steel during the heat treatment, in particular, diffusible hydrogen present at the grain boundaries is applied with stress during bending processing, and acts to easily induce and propagate grain boundary cracks. Therefore, properties such as bendability and impact resistance may be improved by reducing the content of the diffusible hydrogen in steel.

In particular, the present inventors have found that formation of a Sb-rich layer having an appropriate concentration and thickness between the base steel sheet and the plating layer makes it possible to achieve this effect. This is because the Sb-rich layer serves as an effective barrier to relatively reduce the amount of diffusible hydrogen occluded in the steel.

Specifically, in order to effectively reduce the hydrogen content in the steel to improve hydrogen brittleness resistance and also to secure excellent impact resistance, the plated steel sheet for hot press forming preferably satisfies the following Relational Expressions 1-1 and 1-2. In this case, since Relational Expressions 1-1 and 1-2 are empirically obtained values, a unit may not be specifically determined, and it is sufficient when a unit of each variable defined below is satisfied.

[Relational Expression 1-1]

$$\frac{Sb_{max}}{Sb_{coat}} \geq 1.2$$

[Relational Expression 1-2]

$$\frac{(Sb_{max} - Sb_{coat})}{2} \times \Delta t \geq 0.008$$

[In Relational Expressions 1-1 and 1-2, $Sb_{coat}$ represents an average content of Sb in the plating layer, and a unit thereof is wt %, $Sb_{max}$ represents a maximum value of a content of Sb in the Sb-rich layer, and a unit thereof is wt %, and $\Delta t$ represents a linear distance from a boundary between the plating layer and the Sb-rich layer to a point where $Sb_{max}$ is measured, and a unit thereof is μm.]

That is, in order to exhibit the desired effect of the present disclosure, the Sb-rich layer provided between the base steel sheet and the plating layer should be formed to have predetermined levels or more of a Sb concentration and a thickness so that both Relational Expressions 1-1 and 1-2 are satisfied. In this case, $Sb_{coat}$, $Sb_{max}$, and $\Delta t$ may be measured from data obtained when a change in content of Sb in the thickness direction of the base steel sheet is analyzed at a certain point in the plating layer using glow discharge optical emission spectrometry (GDS). In other words, $Sb_{coat}$ may refer to the extension line of the Sb average content line for a section from a point spaced apart from a point (200: $Sb_{max}$ point) where the content of Sb is the maximum value in the Sb-rich layer 2 to the plating layer 1 by 15 μm to a point spaced apart from the $Sb_{max}$ point by 20 μm in a GDS profile graph measured by the method of FIG. 7.

When a value of $Sb_{max}/Sb_{coat}$ is less than 1.2 in Relational Expression 1-1 or a value of $(Sb_{max}-Sb_{coat})/2\times\Delta t$ is less than 0.008 in Relational Expression 1-2, the Sb concentration and formed thickness in the Sb-rich layer are not sufficient, such that it is difficult to expect to play a role as a barrier that relatively reduces the amount of diffusible hydrogen occluded in the steel. Meanwhile, in FIG. 1, an area corresponding to Relational Expression 1-2 is shown as a hatched portion, and the area of the hatched portion described above indicates the Sb concentration gradient according to $\Delta t$, which represents a distance between a point where $Sb_{coat}$ is measured and a point where $Sb_{max}$ is measured.

Alternatively, according to an exemplary embodiment in the present disclosure, more preferably, a lower limit of the $Sb_{max}/Sb_{coat}$ value defined in Relational Expression 1-1 may be 1.20, and more preferably, an upper limit of the $Sb_{max}/Sb_{coat}$ value defined in Relational Expression 1-1 may be 5.11.

In addition, according to an exemplary embodiment in the present disclosure, more preferably, a lower limit of the $(Sb_{max}-Sb_{coat})/2\times\Delta t$ value defined in Relational Expression 1-2 may be 0.0080, and more preferably, an upper limit of the $(Sb_{max}-Sb_{coat})/2\times\Delta t$ value defined in Relational Expression 1-2 may be 0.1438.

Meanwhile, although not particularly limited, according to an exemplary embodiment in the present disclosure, in the plated steel sheet, a thickness of the Sb-rich layer may be in a range of 1 μm to 20 μm. When the thickness of the Sb-rich layer in the plated steel sheet is less than 1 μm, a sufficient Su-rich layer is not formed even after a heat treatment for hot press forming is performed, such that it may be difficult to expect the desired effect of improving hydrogen brittleness resistance and impact resistance. In addition, when the thickness of the Sb-rich layer exceeds 15 μm, after hot press forming, as Sb is excessively precipitated at the grain boundaries, Sb precipitates act as a crack site when stress is generated, such that the impact resistance may be deteriorated.

In terms of maximizing the effect described above, more preferably, in the plated steel sheet, a lower limit of the thickness of the Sb-rich layer may be 3 μm, and an upper limit of the thickness of the Sb-rich layer may be 15 μm. Alternatively, in the plated steel sheet, the thickness of the Sb-rich layer may be in a range of 3 to 15 μm.

Meanwhile, as a result of conducting additional intensive studies to further improve the physical properties of the plated steel sheet and the member, the present inventors have found that the performance is improved by concentrating an appropriate amount of Sb in a manganese segregation band present in the base steel sheet of the plated steel sheet. That is, as a result of examining various conditions, the present inventors have confirmed that such an effect is further improved when the amount of Sb concentrated in the segregation band satisfies a predetermined level or more, or when a thickness of the Mn segregation band satisfies a predetermined level or less.

Specifically, according to an exemplary embodiment in the present disclosure, although not particularly limited, in the plated steel sheet, the base steel sheet includes the Mn segregation band, and an area where an average content of Sb in the Mn segregation band is 1.015 times or more the average content of Sb in the base steel sheet may be 60% or more in terms of an area fraction (alternatively, more preferably, may be 70% or more). By satisfying this, formation of inclusions such as MnS, which are mainly formed in the Mn segregation band, is reduced, which plays a role in suppressing crack occurrence and propagation sites when stress is generated, such that excellent impact resistance may be secured. In addition, when MnS is excessively formed, a cleavage fracture may be excessively developed. Therefore, when Sb is concentrated, MnS may be reduced by satisfying the configuration described above, and thus the cleavage fracture may be reduced, such that the bendability may be further improved.

In this case, an upper limit of the average content of Sb in the Mn segregation band is not particularly limited, and as an example, the average content of Sb in the Mn segregation band may be 5 times or less the average content of Sb in a region of the base steel sheet other than the Mn segregation band. In addition, although not particularly limited, an upper limit of the area where the average content of Sb in the Mn segregation band is 1.015 times or more the average content of Sb in the base steel sheet may be 90%.

Figure 6A:
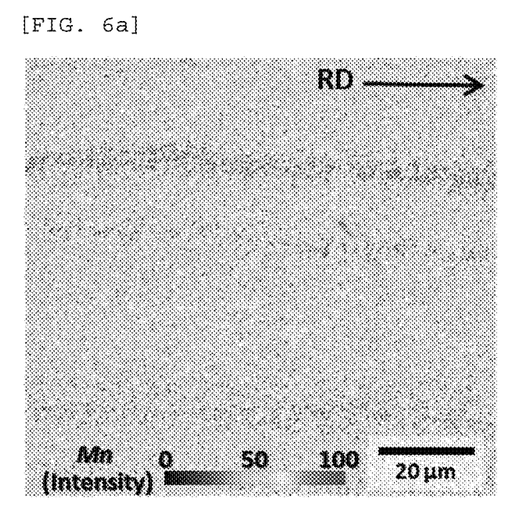
FIG. 6 illustrates an EPMA element mapping result for confirming a Mn segregation band (FIG. 6A) and a Sb-rich amount in the Mn segregation band (FIG. 6B) for a hot press formed member of Inventive Example 14.

The Mn segregation band may be identified using an EPMA element mapping result for Mn as illustrated in FIG. 6A. Specifically, a Mn intensity average value obtained by EPMA measured by performing the heat treatment of the plated steel sheet at a temperature of 1,200° C. or higher for several hours and then quenching the heat-treated plated steel sheet to remove the Mn segregation band is referred to as $Mn_0$. Thereafter, in a case in which a square with an area of 0.4 $\mu m^2$ is drawn vertically and horizontally around a specific point among the points measured in EPMA, among the points located in the square, when the area where the Mn intensity is 1.015 times or greater than $Mn_0$ is 50% or more, the specific point is defined as a Mn segregation point, and when it is less than 50%, the specific point is defined as not a Mn segregation point. A region drawn by collecting these Mn segregation points and then connecting the outermost Mn segregation points with a linear line is referred to as a Mn segregation band.

In addition, a ratio (Sb2/Sb1) of the average content of Sb in the Mn segregation band (Sb2) to the average content of Sb in the base steel sheet (Sb1) may be measured using a ratio of intensities obtained by the Sb element mapping result using EPMA.

In addition, according to an exemplary embodiment in the present disclosure, although not particularly limited, in the plated steel sheet for hot press forming, the thickness of the Mn segregation band may be 20 µm or less, and by satisfying this, the impact resistance and the bendability may be further improved. The impact resistance and the bendability may be improved as the thickness of the Mn segregation band is thinner, a lower limit of the thickness of the Mn segregation band may not be separately limited. However, as an example, the lower limit of the thickness of the Mn segregation band may exceed 0 µm or may be 1 µm or more. In this case, as for the thickness of the Mn segregation band, a value obtained by measuring an average thickness in the thickness direction (direction perpendicular to a rolling direction of the steel sheet) from the image of the Mn segregation band determined by the method described above may be defined as the thickness of the Mn segregation band. Meanwhile, in the plated steel sheet for hot press forming, in terms of maximizing the effect described above, more preferably, an upper limit of the thickness of the Mn segregation band may be 18.9 µm, and the lower limit of the thickness of the Mn segregation band may be 6.9 µm.

Meanwhile, a hot press formed member having excellent hydrogen brittleness resistance and impact resistance may be manufactured using the plated steel sheet for hot press forming having the configuration described above by a hot press forming method described below.

A hot press formed member according to an aspect of the present disclosure includes: a base steel sheet having the same alloy composition as that of the base steel sheet of the plated steel sheet described above; an aluminum or aluminum alloy plating layer provided on at least one surface of the base steel sheet; and a Sb-rich layer provided between the base steel sheet and the plating layer, and the hot press formed member satisfies the following Relational Expressions 2-1 and 2-2. In this case, the description described above may be equally applied to the description of the base steel sheet, the plating layer, and the Sb-rich layer. In this case, since Relational Expressions 2-1 and 2-2 are empirically obtained values, a unit may not be specifically determined, and it is sufficient when a unit of each variable is satisfied.

[Relational Expression 2-1]

$$\frac{Sb_{max}}{Sb_{coat}} \geq 1.5$$

[Relational Expression 2-2]

$$\frac{(Sb_{max} - Sb_{coat})}{2} \times \Delta t \geq 0.01$$

[In Relational Expressions 2-1 and 2-2, $Sb_{coat}$ represents an average content of Sb in the plating layer, and a unit thereof is wt %, $Sb_{max}$ represents a maximum value of a content of Sb in the Sb-rich layer, and a unit thereof is wt %, and $\Delta t$ represents a linear distance from a boundary between the plating layer and the Sb-rich layer to a point where $Sb_{max}$ is measured, and a unit thereof is µm.]

In the present disclosure, when the plated steel sheet is heated for hot press forming, a degree of Sb concentration of the Sb-rich layer is more increased. Therefore, in the hot press formed member according to the present disclosure, when Relational Expressions 2-1 and 2-2 are satisfied, the hydrogen content in the steel is effectively reduced, such that the hydrogen brittleness resistance and the impact resistance may be improved. In this case, the distinguishing method in the plated steel sheet described above may be equally applied to a method for distinguishing a boundary between the plating layer and the Sb-rich layer and a boundary between the base steel sheet and the Sb-rich layer in the hot press formed member.

Alternatively, according to an exemplary embodiment in the present disclosure, more preferably, a lower limit of the $Sb_{max}/Sb_{coat}$ value defined in Relational Expression 2-1 may be 1.57, and more preferably, an upper limit of the $Sb_{max}/Sb_{coat}$ value defined in Relational Expression 2-1 may be 7.39.

In addition, according to an exemplary embodiment in the present disclosure, more preferably, a lower limit of the $(Sb_{max}-Sb_{coat})/2 \times \Delta t$ value defined in Relational Expression 2-2 may be 0.0148, and more preferably, an upper limit of the $(Sb_{max}-Sb_{coat})/2 \times \Delta t$ value defined in Relational Expression 2-2 may be 0.1940.

Alternatively, although not particularly limited, according to an exemplary embodiment in the present disclosure, more preferably, the hot press formed member may satisfy the following Relational Expression 2-3, which may further improve the hydrogen brittleness resistance and the impact resistance.

[Relational Expression 2-3]

$$\frac{(Sb_{max} - Sb_{coat})}{2} \times \Delta t \geq 0.1472$$

Although not particularly limited, according to an exemplary embodiment in the present disclosure, in the hot press formed member, a microstructure of the base steel sheet may contain 5% or less of ferrite and residual martensite. Additionally, the microstructure of the base steel sheet may further contain 1% or less of other phases such as upper bainite, retained-austenite, cementite, and pearlite.

According to an exemplary embodiment in the present disclosure, the base steel sheet may contain 5% or less of ferrite in terms of an area fraction, and in hot press forming, the ferrite fraction may be managed to 5% or less by securing hardenability according to steel element control and securing a sufficient cooling rate. Meanwhile, in the hot press formed member, when the ferrite fraction of the base steel sheet exceeds 5%, the strength is reduced, and a local stress is concentrated in ferrite that is relatively soft, which accelerates crack propagation, such that the impact resistance may be significantly deteriorated.

In addition, according to an exemplary embodiment in the present disclosure, although not particularly limited, in the hot press formed member, a thickness of the Sb-rich layer may be 2 to 30 µm. When the thickness of the Sb-rich layer in the hot press formed member is less than 2 µm, hydrogen permeating into the steel during hot press forming may not be effectively suppressed, such that the desired effect of improving hydrogen brittleness resistance and impact resistance may not be sufficiently exhibited. In addition, when the thickness of the Sb-rich layer in the hot press formed member exceeds 30 µm, Sb not only constitutes a concentration layer but also may be excessively precipitated at the grain boundary of a surface layer of the base iron, which may accelerate crack occurrence and propagation during bending, such that the impact resistance may be deteriorated.

In terms of maximizing the effect described above, more preferably, in the hot press formed member, a lower limit of the thickness of the Sb-rich layer may be 3 µm, or an upper limit of the thickness of the Sb-rich layer may be 25 µm. Alternatively, in the hot press formed member, the thickness of the Sb-rich layer may be in a range of 3 to 25 µm.

In addition, although not particularly limited, according to an exemplary embodiment in the present disclosure, the amount of diffusible hydrogen of the hot press formed member may be 0.2 ppm or less, and thus, excellent hydrogen brittleness resistance may be secured. This is because, in the case of the amount of diffusible hydrogen of 0.2 ppm or less, cracks in a part do not occur even when stress is applied to a specimen by bending under the same yield stress of the material for 120 hours.

In addition, although not particularly limited, according to an exemplary embodiment in the present disclosure, in the hot press formed member, the base steel sheet includes a Mn segregation band, and an area where an average content of Sb in the Mn segregation band is 1.015 times or more the average content of Sb in the base steel sheet may be 60% or more in terms of an area fraction (alternatively, more preferably, may be 70% or more). By satisfying this, formation of inclusions such as MnS, which are mainly formed in the Mn segregation band, is reduced, which plays a role in suppressing crack occurrence and propagation sites when stress is generated, such that excellent impact resistance may be secured. In addition, when MnS is excessively formed, a cleavage fracture may be excessively developed. Therefore, when Sb is concentrated, MnS may be reduced by satisfying the configuration described above, and thus the cleavage fracture may be reduced, such that the bendability may be further improved.

In this case, an upper limit of the average content of Sb in the Mn segregation band is not particularly limited, and as an example, the average content of Sb in the Mn segregation band may be 5 times or less the average content of Sb in a region of the base steel sheet other than the Mn segregation band. In addition, although not particularly limited, an upper limit of the area where the average content of Sb in the Mn segregation band is 1.015 times or more the average content of Sb in the base steel sheet may be 95%.

In addition, although not particularly limited, according to an exemplary embodiment in the present disclosure, in the hot press formed member, the thickness of the Mn segregation band may be 15 µm or less (or 15.0 µm), and by satisfying this, the impact resistance and the bendability may be further improved. The impact resistance and the bendability may be improved as the thickness of the Mn segregation band is thinner, a lower limit of the thickness of the Mn segregation band may not be separately limited. However, as an example, the lower limit of the thickness of the Mn segregation band may exceed 0 µm or may be 1.5 µm. Meanwhile, in terms of maximizing the effect described above, more preferably, an upper limit of the thickness of the Mn segregation band may be 12.0 µm, and the lower limit of the thickness of the Mn segregation band may be 6.0 µm.

In this case, the measurement method and the measurement standard in the plated steel sheet described above may be equally applied to the definition of the Mn segregation band, the ratio of the average content of Sb in the Mn segregation band to the average content of Sb in the base steel sheet, and the measurement of the thickness of the Mn segregation band in the hot press formed member.

Next, a method for manufacturing a plated steel sheet for hot press forming as another aspect of the present disclosure will be described.

The plated steel sheet for hot press forming according to an aspect of the present disclosure may include: reheating a steel slab containing, by wt %, the alloy composition described above to 1,050 to 1,300° C.; finish rolling the heated steel slab at 800 to 950° C. to obtain a hot-rolled steel sheet; coiling the hot-rolled steel sheet at 500 to 700° C.; pickling the coiled hot-rolled steel sheet so that a product of an acid concentration and a pickling time is 800 to 10,000 g/L*s; annealing the pickled hot-rolled steel sheet at 700 to 860° C. under a dew point temperature condition of −75 to −20° C. in a furnace; and after the annealing, plating the hot-rolled steel sheet by passing the hot-rolled steel sheet through a plating bath formed of aluminum or an aluminum alloy.

Slab Reheating

First, a slab having the alloy composition described above is reheated to 1,050 to 1,300° C. When the reheating temperature is lower than 1,050° C., a slab structure is not sufficiently homogenized, and thus, when precipitated elements are used, it is difficult to sold-dissolve these elements again. On the other hand, when the reheating temperature exceeds 1,300° C., an oxide layer is excessively formed, which causes an increase in manufacturing cost for removing the oxide layer, and the possibility of surface defects occurring after finish rolling is increased.

Finish Rolling

Finish rolling should be performed at 800 to 950° C. When the finish rolling temperature is lower than 800° C., two phase region rolling is performed, and ferrite is introduced into the surface layer of the steel sheet, such that it is difficult to control a sheet shape. On the other hand, when the finish rolling temperature exceeds 950° C., coarsening of grains of the hot-rolled steel sheet may occur.

Coiling

After the finish rolling is finished, the hot-rolled steel sheet is coiled at 500 to 700° C. and then cooled to manufacture a hot-rolled coil. When the coiling temperature is lower than 500° C., it is difficult to control a shape of the coil because martensite is formed in the whole or a portion of the steel sheet, and cold rolling properties may be deteriorated due to an excessive increase in strength of the hot-rolled steel sheet. On the other hand, when the coiling temperature exceeds 700° C., coarse carbides are excessively formed, and when stress is generated in the hot press formed member, the occurrence of cracks is accelerated, resulting in deterioration of the impact resistance.

Pickling

The coiled hot-rolled steel sheet is pickled so that a product of an acid concentration and a pickling time is 800 to 10,000 g/L*s. In the steel sheet subjected to the reheating, the finish rolling, and the coiling described above, a Sb-rich layer is formed. When the product of the acid concentration and the pickling time is applied within the range of 800 to 10,000 g/L*s in the pickling process, the Sb-rich layer, which is the core of the present disclosure, is effectively protected, and the effect of reducing the amount of diffusible hydrogen in steel may be exhibited.

Specifically, when the product of the acid concentration and the pickling time is less than 800 g/L*s, a scale generated during the finish rolling is not sufficiently removed, which may cause product quality problems. On the other hand, when the product of the acid concentration and the pickling time exceeds 10,000 g/L*s, the whole or a portion of the Sb-rich layer is lost during pickling, and thus, the expected effect may not be exhibited, and manufacturing costs may be increased. Therefore, an upper limit thereof is set to 10,000 g/L*s. However, in a case in which the number of pickling tanks is one or more and acid concentrations and pickling times are different, the above value may be expressed by adding the products of the acid concentrations and the pickling times of the respective tanks.

Meanwhile, in terms of maximizing the effect described above, more preferably, a lower limit of the product of the acid concentration and the pickling time may be 3,000 g/L*s, or an upper limit of the product of the acid concentration and the pickling time may be 5,000 g/L*s.

Although not particularly limited, according to an exemplary embodiment in the present disclosure, as an acid that may be used in the pickling, an acid commonly used in the art may be applied. Representative examples thereof include hydrochloric acid (HCl) and sulfuric acid ($H_2SO_4$), and in particular, in the present disclosure, when hydrochloric acid (HCl) is used, the pickling performance is excellent and the process cost is saved, and it is possible to easily secure the surface quality because the possibility of generation of surface foreign matters after pickling is low, compared to the case of using another acid.

Meanwhile, although not particularly limited, according to an exemplary embodiment in the present disclosure, the acid concentration may be in a range of 40 to 500 g/L. When the acid concentration is less than 40 g/L, a surface scale generated in the hot rolling during a limited pickling time is not sufficiently removed, and thus, defects may occur in the surface layer of the steel sheet. On the other hand, when the acid concentration exceeds 500 g/L, the Sb-rich layer is lost, such that it is difficult to exhibit the desired effect of the present disclosure in the final hot press formed member, and the defects in the surface layer may be caused due to excessive pickling. Meanwhile, in terms of maximizing the effect described above, more preferably, a lower limit of the acid concentration may be 180 g/L, or an upper limit of the acid concentration may be 230 g/L.

In addition, although not particularly limited, according to an exemplary embodiment in the present disclosure, the pickling time may be 5 to 60 seconds (s). When the pickling time is shorter than 5 seconds, the surface scale of the steel sheet is not sufficiently removed, which may cause defects in the surface layer, and when the pickling time exceeds 60 seconds, the Sb-rich layer is lost, such that the productivity is reduced, resulting in an increase in process cost. In terms of maximizing the effect described above, more preferably, a lower limit of the pickling time may be 18 seconds (s), or an upper limit of the pickling time may be 50 seconds (s).

In addition, although not particularly limited, according to an exemplary embodiment in the present disclosure, the pickling temperature may be 40 to 120° C. When the pickling temperature is lower than 40° C., a pickling force is not sufficient, which may adversely affect the quality of the product. On the other hand, when the pickling temperature exceeds 120° C., a fixed cost is increased to maintain the steel sheet at a high temperature, and the amount of pickling solution vaporized is increased due to the high temperature, which may cause an increase in cost for replenishing the lost pickling solution. In terms of maximizing the effect described above, more preferably, a lower limit of the pickling temperature may be 50° C., or an upper limit of the pickling temperature may be 100° C. Alternatively, the pickling temperature may be in a range of 50 to 100° C.

Annealing

The pickled hot-rolled steel sheet may be annealed at 700 to 900° C. under a dew point temperature condition of −75 to +20° C. in a furnace. When the annealing temperature is lower than 700° C., the recrystallization of the cold-rolled structure is not sufficiently completed, such that the sheet shape may be poor, and the strength after plating is excessively high, which may cause wear of the mold during a blanking process. On the other hand, when the annealing temperature exceeds 900° C., formation of surface oxides is accelerated during the annealing process, which causes defects on an Al—Si plated surface. Alternatively, in terms of suppressing wear of the mold and the defects on the plated surface during the blanking process, a lower limit of the annealing temperature may be preferably 750° C., and most preferably 800° C. Similarly, an upper limit of the annealing temperature may be more preferably 860° C., and most preferably 860° C.

In addition, the atmosphere during annealing is preferably a non-oxidizing atmosphere, and a hydrogen-nitrogen mixed gas or the like may be used. In this case, the annealing is performed at a dew point of the atmospheric gas of −75° C. or higher and +20° C. or lower. When the dew point is lower than −75° C., an additional equipment for controlling the dew point is required, which causes an increase in manufacturing cost. On the other hand, when the dew point exceeds +20° C., annealed oxides are formed on the surface of the steel sheet during annealing, which may cause surface quality defects such as unplating. Meanwhile, in terms of maximizing the effect described above, a lower limit of the dew point may be more preferably −70° C., and most preferably −40° C. Alternatively, an upper limit of the dew point during the annealing may be more preferably +15° C., and most preferably −20° C.

Plating

After the annealing, Al—Si plating is performed immediately. Specifically, after the annealing, a plated steel sheet may be manufactured by passing the hot-rolled steel sheet through a plating bath formed of aluminum or an aluminum alloy. In this case, any plating conditions may be applied to the present disclosure without limitation as long as they are generally applied to a steel sheet for hot press forming, and as an example, a composition of the plating bath may contain 6 to 12% of Si, 1 to 4% of Fe, and a balance of Al and unavoidable impurities.

In this case, although not particularly limited, in general, a plating amount in the plating is preferably 20 to 140 g/m² based on one surface to be manufactured. When the plating amount is less than 20 g/m² based on one surface, it is difficult to secure corrosion resistance of the desired hot press formed member, and when the plating amount exceeds 140 g/m², manufacturing costs is increased due to an excessive coating amount, and it is not easy to plate the hot press formed member in the entire width and length directions of the coil with a uniform plating amount.

Cold Rolling

The method for manufacturing a plated steel sheet for hot press forming according to an aspect of the present disclosure may further include, after the pickling, cold rolling the hot-rolled steel sheet to manufacture a cold-rolled steel sheet.

Continuous Casting

The method for manufacturing a plated steel sheet for hot press forming according to the present disclosure may further include, before the heating of the slab, subjecting the slab to continuous casting by soft reduction, but is not limited thereto. In the present disclosure, a slab is manufactured by applying soft reduction in continuous casting, such that segregation is reduced, which may improve the impact resistance. This is because when excessive slab segregation occurs, a thickly concentrated segregation band is formed even in the final hot press formed member, and the impact resistance may be reduced due to a hardness difference occurring between the segregation band and the base steel sheet region other than the Mn segregation band and formation of inclusions in the segregation band.

Therefore, in order to manufacture the present slab, soft reduction should be performed prior to the finally solidified position of the slab during continuous casting, and a total reduction ratio during soft reduction by continuous casting is preferably controlled to 0.5 to 5%. When the total reduction ratio during continuous casting is less than 0.5%, the reduction is hardly achieved and the center segregation is not sufficiently removed, such that the impact resistance in the hot press formed member may be deteriorated. On the other hand, when the total reduction ratio during continuous casting exceeds 5%, a load of a reduction roll equipment may occur, which may accelerate equipment failure and deterioration. Meanwhile, in terms of maximizing the effect described above, more preferably, a lower limit of the total reduction ratio during soft reduction by the continuous casting may be 0.52%, or an upper limit of the total reduction ratio during soft reduction by the continuous casting may be 4.10%.

The plated steel sheet for hot press forming manufactured by the manufacturing method described above may be subjected to hot press forming to manufacture a hot press formed member having excellent hydrogen brittleness resistance and impact resistance. Specifically, a method for manufacturing a final member having excellent hydrogen brittleness resistance and impact resistance through hot press forming and die quenching using the plated steel sheet manufactured by the method described above will be described. A blank for hot press forming is manufactured using the plated steel sheet manufactured by the steel composition and the manufacturing method described above. The blank is heated at an austenite single phase region temperature or higher, and more specifically, in a temperature range of an Ac3 temperature or higher and 975° C. or lower. In this case, when the heating temperature is lower than the Ac3 temperature, it is difficult to secure strength and impact resistance due to the presence of untransformed ferrite according to the two phase region. On the other hand, when the heating temperature exceeds 975° C., excessive oxides are formed on the surface of the member, such that it is difficult to secure spot weldability and manufacturing costs for maintaining a high temperature is increased.

Thereafter, it is preferable that the heated blank is maintained in the above temperature range for 1 to 1,000 seconds. When the maintenance time is shorter than 1 second, it is difficult to uniformly distribute the temperature throughout the blank temperature, which may cause a material variation for each position. On the other hand, when the maintenance time exceeds 1,000 seconds, as in the case of exceeding the heating temperature, it is difficult to secure spot weldability due to formation of excessive oxides on the surface of the member, and manufacturing costs of the member is increased.

The heated blank is transferred to a press, and hot press forming and die quenching are performed at a cooling rate of −20° C./s or more, thereby manufacturing a final member. In this case, at a cooling rate of less than −20° C./s, a ferrite phase may be introduced and formed at the grain boundaries during cooling, which may cause deterioration of the strength and the impact resistance. The transfer of the blank, the hot press forming, and the cooling described above are not particularly limited, and a commonly used hot press forming method may be applied as it is.

In the hot press formed member manufactured as described above, the Sb-rich layer in which Sb is concentrated is formed between the base steel sheet and the plating layer, and therefore, it is possible to manufacture a hot press formed member having excellent hydrogen brittleness resistance and impact resistance according to the reduction in amount of diffusible hydrogen in steel.

MODE FOR INVENTION

Hereinafter, the present disclosure will be described in more detail with reference to Examples. However, the following Examples are provided to illustrate and describe the present disclosure in detail, but are not intended to limit the scope of the present disclosure. This is because the scope of the present disclosure is determined by contents disclosed in the claims and contents reasonably inferred therefrom.

Experimental Example 1

The composition of the steel used for the present disclosure is shown in Table 1 (corresponding to the balance of Fe and other impurities). Slabs having each composition were manufactured by vacuum melting to a thickness of 40 mm. These slabs were maintained at 1,200° C. for 1 hour, the slabs were hot-rolled at a hot rolling end temperature of 900° C., and then the hot-rolled slabs were coiled at a coiling temperature of 600° C. Thereafter, the coiled slabs were pickled and cold-rolled, annealing was performed under the conditions shown in Table 2, and plating was performed by immersing the annealed slabs in a plating bath formed of Al-9% Si-2% Fe and a balance of a trace of impurities. At this time, the pickling process was performed at a HCl concentration of 200 g/L for a pickling time of 20 seconds, and a product of the HCl concentration and the pickling time was collectively applied at 4,000 g/L·s, which was within the range of the present disclosure.

In Inventive Examples, hot press forming was performed at various temperatures, a heating time of 6 minutes and a transfer time to a mold of 10 seconds were applied, and then die quenching was applied.

Figure 1:
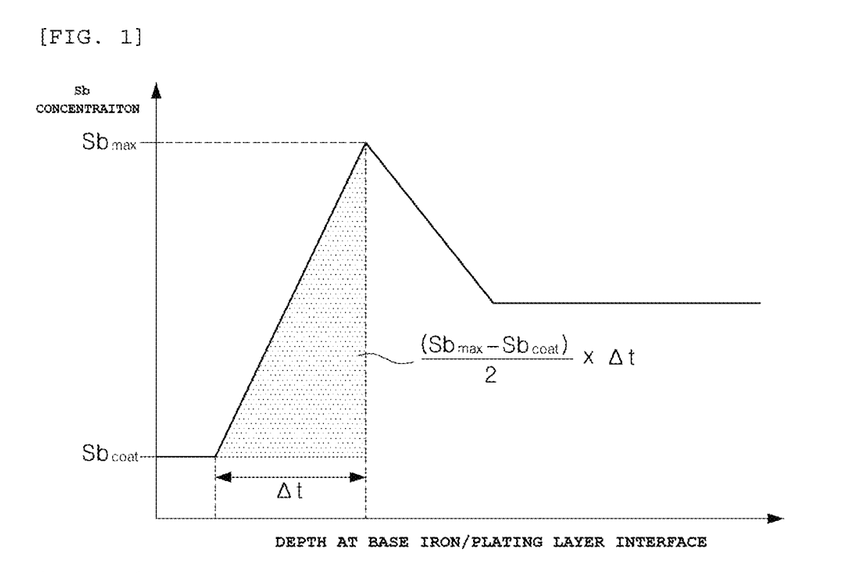
FIG. 1 is a graph schematically showing a Sb-rich layer gradient concentration at an interface between a base steel sheet and a plating layer.
Figure 3:
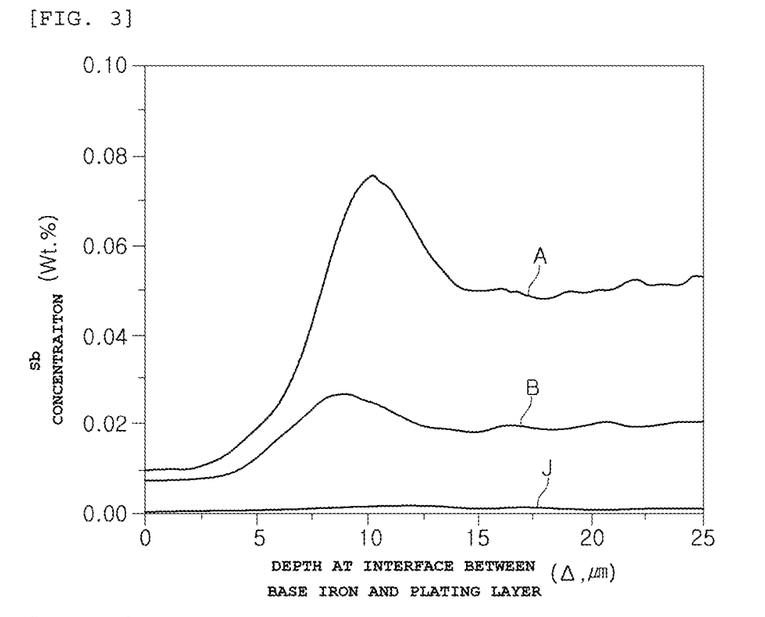
FIG. 3 is a graph showing a concentration gradient according to a content of Sb in a thickness direction from the plating layer to the base steel sheet measured according to glow discharge optical emission spectrometry (GDS) for Inventive Examples and Comparative Examples.

In the specimen manufactured as described above, a structure analysis was performed to observe ferrite, and in order to confirm a Sb-rich layer near the surface, a Sb-rich layer at an interface between base iron and a plating layer was detected as illustrated in FIG. 3 using GDS850A (model name, manufactured by LECO) and a DC and FR apparatus with glow discharge optical emission spectrometry (GDS). Based on this result, the parameters $Sb_{max}$, $Sb_{coat}$ and $\Delta t$ were measured as illustrated in FIG. 1, a value of a concentration layer parameter P1 shown in the following table was calculated using these parameters, and measurement was performed to confirm the amount of diffusible hydrogen accordingly using a thermal desorption analysis apparatus (model name: Bruker G8). At this time, a diffusible hydrogen curve was measured by raising the temperature to 400° C. at 20° C./min and maintaining the time so that a diffusible hydrogen peak sufficiently appeared, and a total amount of diffusible hydrogen in steel was obtained by integrating this curve.

Figure 2:
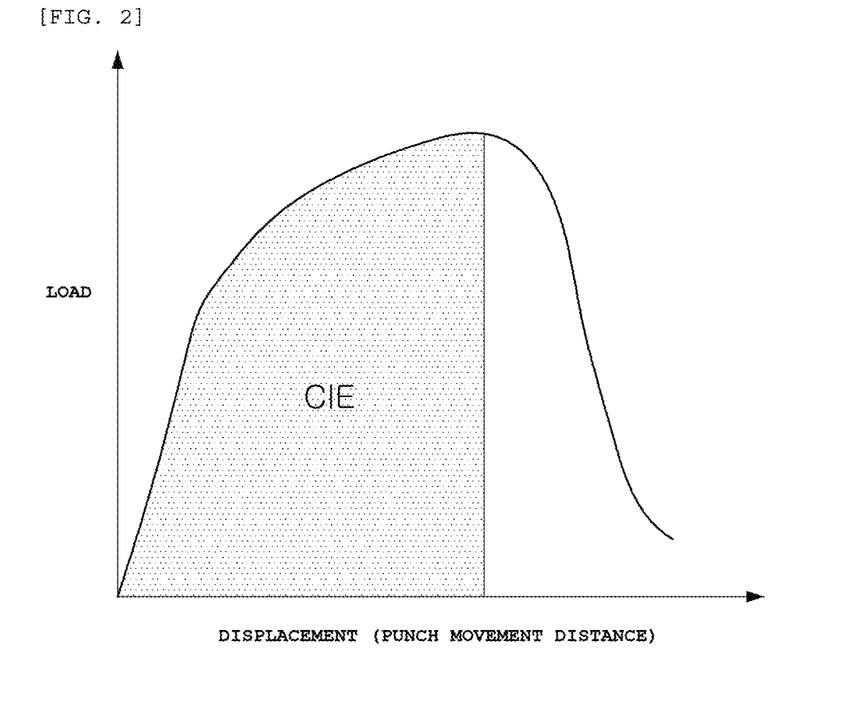
FIG. 2 schematically illustrates a load-displacement curve and a CIE for indicating impact resistance obtained in a three-point bending test.

In addition, in order to confirm impact resistance, bendability was evaluated one week after a hot press forming heat treatment, and from a load-displacement curve obtained in a three-point bending test illustrated in FIG. 2, the impact resistance was evaluated using an area (crack initiation energy (CIE)) index until reaching the maximum load. It was indicated as "good" when a CIE value was 35,000 N·m or more and as "poor" when the CIE value was less than 35,000 N·m, the CIE value being measured to determine whether or not the impact resistance was excellent. The results thereof are shown in Tables 2 and 3.

TABLE 1

| Steel type | C | Si | Mn | P | S | Al | Cr | N | Ti | B | Sb |
|---|---|---|---|---|---|---|---|---|---|---|---|
| A | 0.218 | 0.31 | 1.1 | 0.012 | 0.001 | 0.028 | 0.19 | 0.0042 | 0.027 | 0.0026 | 0.049 |
| B | 0.222 | 0.4 | 1.2 | 0.013 | 0.001 | 0.023 | 0.19 | 0.0035 | 0.029 | 0.0026 | 0.018 |
| C | 0.224 | 0.26 | 1.2 | 0.01 | 0.001 | 0.034 | 0.5 | 0.0026 | 0.031 | 0.0027 | 0.027 |
| D | 0.222 | 0.35 | 1.1 | 0.011 | 0.001 | 0.029 | 0.4 | 0.004 | 0.03 | 0.0025 | 0.095 |
| E | 0.325 | 0.81 | 2.1 | 0.011 | 0.001 | 0.046 | 0.19 | 0.0049 | 0.031 | 0.0025 | 0.05 |
| F | 0.335 | 0.58 | 0.5 | 0.011 | 0.001 | 0.023 | 0.17 | 0.0053 | 0.032 | 0.0025 | 0.019 |
| G | 0.147 | 0.60 | 1.1 | 0.011 | 0.002 | 0.031 | 0.21 | 0.0041 | 0.027 | 0.003 | 0.037 |
| H | 0.36 | 0.73 | 0.6 | 0.013 | 0.001 | 0.05 | 0.3 | 0.0043 | 0.029 | 0.0029 | 0.002 |
| I | 0.23 | 0.52 | 1.2 | 0.008 | 0.001 | 0.025 | 0.3 | 0.0047 | 0.025 | 0.0025 | 0.001 |
| J | 0.081 | 0.31 | 1.2 | 0.009 | 0.002 | 0.033 | 0.31 | 0.0029 | 0.03 | 0.0026 | 0.003 |
| L | 0.211 | 0.11 | 3.7 | 0.003 | 0.007 | 0.011 | 0.011 | 0.0077 | 0.031 | 0.0029 | 0.006 |
| M | 0.154 | 0.22 | 1.5 | 0.012 | 0.005 | 0.071 | 0.15 | 0.005 | 0.03 | 0.0026 | 0.021 |
| N | 0.207 | 0.30 | 1.7 | 0.007 | 0.003 | 0.020 | 0.11 | 0.004 | 0.029 | 0.0025 | 0.004 |

TABLE 2

| Steel type | Annealing condition | | [Relational Expression 1-1] $Sb_{max}/Sb_{coat}$ of plated steel sheet | [Relational Expression 1-2] P1 of plated steel sheet; $(Sb_{max} - Sb_{coat})/2 \times \Delta t$ [% * μm] |
|---|---|---|---|---|
| | Annealing temperature [° C.] | Dew point temperature [° C.] | | |
| A | 850 | −40 | 3.34 | 0.0523 |
| B | 860 | −70 | 2.03 | 0.0149 |
| C | 710 | −30 | 2.35 | 0.0152 |
| D | 840 | +15 | 5.11 | 0.1438 |
| E | 880 | 0 | 3.36 | 0.0567 |
| F | 720 | −50 | 1.88 | 0.0099 |
| G | 890 | −20 | 2.24 | 0.0276 |
| H | 840 | −30 | 1.13 | 0.0045 |
| I | 850 | −25 | 1.12 | 0.0025 |
| J | 890 | −20 | 1.19 | 0.0065 |
| L | 750 | −40 | 1.2 | 0.008 |

TABLE 3

| Steel type | Hot press forming temperature [° C.] | [Relational Expression 2-1] $Sb_{max}/Sb_{coat}$ of member | [Relational Expression 2-2] P1 of member; $(Sb_{max} - Sb_{coat})/2 \times \Delta t$ [% * μm] | Amount of diffusible hydrogen [ppm] | Ferrite fraction [%] | CIE [N * m] | Impact resistance | Remark |
|---|---|---|---|---|---|---|---|---|
| A | 900 | 4.33 | 0.1472 | 0.042 | 0 | 40,456 | Good | Inventive Example 1 |
| B | 900 | 1.89 | 0.0148 | 0.145 | 0 | 40,522 | Good | Inventive Example 2 |
| C | 900 | 2.02 | 0.0205 | 0.123 | 0 | 40,873 | Good | Inventive Example 3 |
| D | 900 | 7.39 | 0.5171 | 0.008 | 0 | 40,245 | Good | Inventive Example 4 |
| E | 900 | 4.42 | 0.1617 | 0.051 | 0 | 42,091 | Good | Inventive Example 5 |
| F | 900 | 1.93 | 0.0186 | 0.131 | 0 | 39,867 | Good | Inventive Example 6 |

TABLE 3-continued

| Steel type | Hot press forming temperature [° C.] | [Relational Expression 2-1] $Sb_{max}/Sb_{coat}$ of member | [Relational Expression 2-2] P1 of member; $(Sb_{max} - Sb_{coat})/2 \times \Delta t$ [% * μm] | Amount of diffusible hydrogen [ppm] | Ferrite fraction [%] | CIE [N * m] | Impact resistance | Remark |
|---|---|---|---|---|---|---|---|---|
| G | 930 | 3.05 | 0.0840 | 0.091 | 0 | 38,557 | Good | Inventive Example 7 |
| H | 900 | 1.09 | 0.0030 | 0.266 | 0 | 28,608 | Poor | Comparative Example 1 |
| I | 900 | 1.04 | 0.0011 | 0.251 | 0 | 31,051 | Poor | Comparative Example 2 |
| J | 880 | 1.12 | 0.0057 | 0.242 | 0 | 30,255 | Poor | Comparative Example 3 |
| J | 930 | 1.41 | 0.0087 | 0.204 | 0 | 33,504 | Poor | Comparative Example 4 |
| J | 800 | 1.07 | 0.0041 | 0.250 | 7.92 | 28,547 | Poor | Comparative Example 5 |
| L | 870 | 1.5 | 0.01 | 0.188 | 0 | 37,055 | Good | Inventive Example 8 |

Ac3=902−255×C+19×Si−11×Mn−5×Cr[° C.]

As shown in Tables 1 to 3, in the cases of Comparative Examples 1 to 5, since the content of Sb in the steel was out of the range of the present disclosure, the $Sb_{max}/Sb_{coat}$ ratio and the P1 value did not satisfy the ranges of the present disclosure, and therefore, the permeation of diffusible hydrogen in steel was not effectively suppressed, resulting in poor impact resistance.

On the other hand, in the cases of Inventive Examples 1 to 8, it was confirmed that the values of Relational Expressions 1-1, 1-2, 2-1, and 2-2 satisfied the ranges of the present disclosure, the amount of diffusible hydrogen in steel was reduced, and at the same time, the CIE value as an impact resistance index was increased, resulting in excellent impact resistance.

Figure 4:
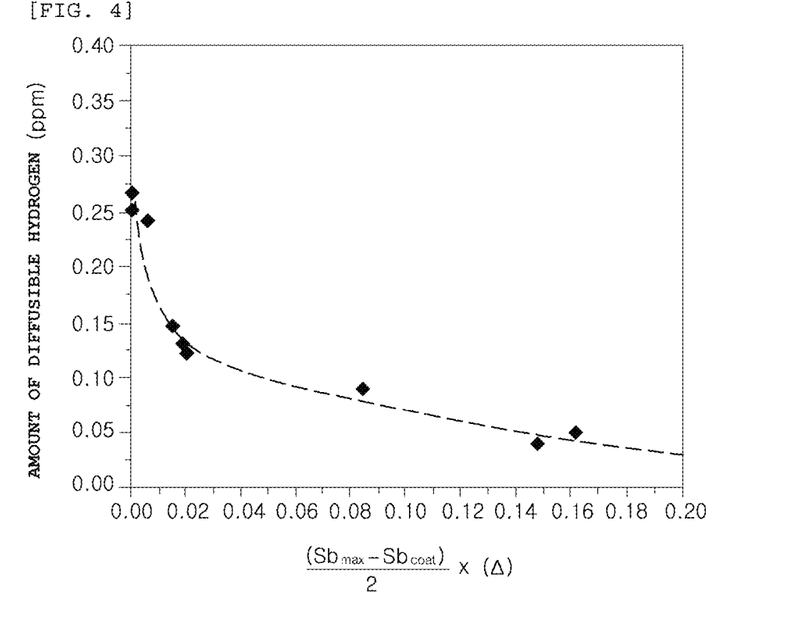
FIG. 4 is a graph of a change in amount of diffusible hydrogen according to a parameter of $(Sb_{max}-Sb_{coat})/2\times\Delta t$ for an exemplary hot press formed member of the present disclosure.
Figure 5:
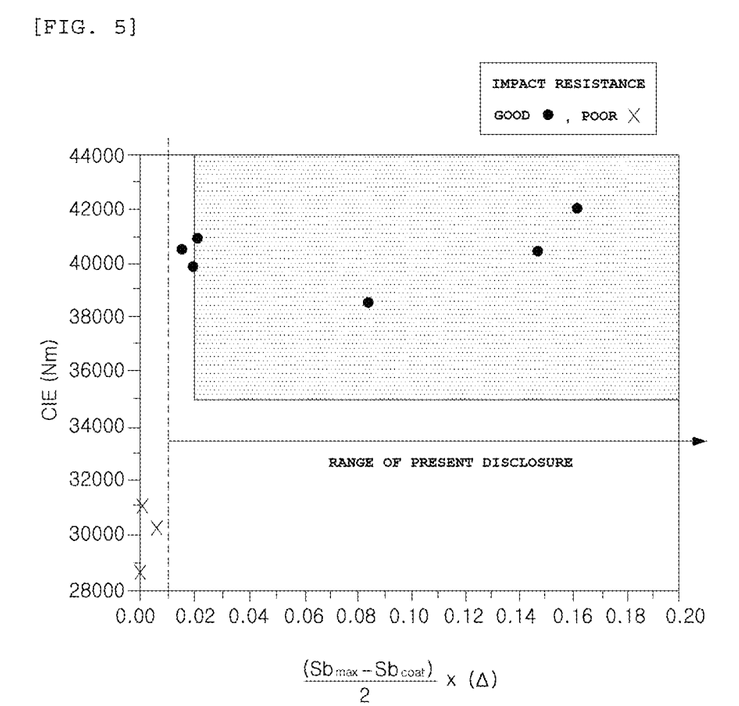
FIG. 5 is a CIE distribution graph according to the parameter of $(Sb_{max}-Sb_{coat})/2\times\Delta t$ for a hot press formed member of the present disclosure.

Meanwhile, except for some results in which the ferrite structure was out of the range of the present disclosure, as illustrated in FIG. 4, it could be seen that the amount of diffusible hydrogen was gradually reduced as the P1 value was increased. It may be understood that the Sb-rich layer serves as an effective barrier to reduce the amount of diffusible hydrogen in steel. As illustrated in FIG. 5, due to this effect, it may be appreciated that when the Sb-rich layer is formed, the CIE value is significantly increased, and excellent impact resistance may be secured at the same time.

Experimental Example 2

A specimen was manufactured in the same manner as that of Experimental Example 1, except that the pickling concentration and the pickling time were changed as shown in Table 4 and the hot press forming temperature was applied under the conditions shown in Table 4. At this time, the pickling temperature was collectively applied at 80° C.

For each of Inventive Examples and Comparative Examples shown in Table 4, the values of Relational Expressions 1-1, 1-2, 2-1, and 2-2 were measured in the same manner as that of Experimental Example 1. The measured values are shown in Table 5. In addition, in the plated steel sheet (or the hot press formed member) of each of Inventive Examples and Comparative Examples, the thickness of the Sb-rich layer was measured by applying the same method described in the specification based on the data obtained by analyzing the change in content of Sb in the thickness direction of the base steel sheet by GDS at any 10 points on the surface of the plating layer (that is, the linear distance in the thickness direction from the last contact point 11 of the Sb average content line and the Sb content line by GDS of the plating layer in the x-axis (+) direction to the last contact point 31 of the Sb average content line and the Sb content line by GDS of the base steel sheet in the x-axis (−) direction in FIG. 7, which was a schematic view, was measured). The average thickness of the Sb-rich layer at the 10 points was measured. The measured results are shown in Table 5.

In order to evaluate each of Inventive Examples and Comparative Examples, the impact resistance was evaluated in the same manner as that of Experimental Example 1, and in order to additionally evaluate the surface properties (that is, the occurrence of the surface defects), it was evaluated whether or not the hot-rolled scale remained after pickling. In order to confirm whether or not hot scale remained after pickling, each type of the steel after pickling was attached to the surface of the specimen using a tape and then the steel was detached. The oxides smeared were attached to white paper, and then whiteness according to color difference analysis was measured. At this case, it was indicated as "good" when the whiteness was 95% or more, and as "poor" when the whiteness was less than 95%.

TABLE 4

| Steel type | Hot press forming temperature [° C.] | HCl concentration [g/L] | Pickling time [s] | HCl concentration* pickling time [g/L*s] | Remark |
|---|---|---|---|---|---|
| H | 900 | 200 | 3 | 600 | Comparative Example 6 |
| A | 870 | 180 | 5 | 900 | Inventive Example 9 |
| A | 900 | 200 | 20 | 4,000 | Inventive Example 10 |
| A | 860 | 180 | 50 | 9,000 | Inventive Example 11 |
| A | 920 | 210 | 50 | 10,500 | Comparative Example 7 |
| F | 880 | 200 | 20 | 4,000 | Inventive Example 12 |
| F | 880 | 250 | 50 | 12,500 | Comparative Example 8 |

TABLE 5

| Steel type | Plated steel sheet | | | Hot press formed member | | | Remark |
| --- | --- | --- | --- | --- | --- | --- | --- |
| | [Relational Expression 1-1] $Sb_{max}/Sb_{coat}$ | [Relational Expression 1-2] P1; $(Sb_{max} - Sb_{coat})/2 \times \Delta t$ [% * μm] | Sb-rich layer thickness [μm] | [Relational Expression 2-1] $Sb_{max}/Sb_{coat}$ | [Relational Expression 2-2] P1; $(Sb_{max} - Sb_{coat})/2 \times \Delta t$ [% * μm] | Sb-rich layer thickness [μm] | |
| H | 1.15 | 0.0031 | 1.4 | 1.30 | 0.0047 | 2.3 | Comparative Example 6 |
| A | 4.55 | 0.1319 | 7.2 | 5.51 | 0.1880 | 9.9 | Inventive Example 9 |
| A | 3.34 | 0.0523 | 5.4 | 4.33 | 0.1472 | 7.8 | Inventive Example 10 |
| A | 1.38 | 0.0102 | 3.8 | 1.57 | 0.0151 | 4.2 | Inventive Example 11 |
| A | 1.12 | 0.0051 | 0.9 | 1.33 | 0.0095 | 1.9 | Comparative Example 7 |
| A | 1.88 | 0.0099 | 3.2 | 1.93 | 0.0186 | 8.5 | Inventive Example 12 |
| F | 1.10 | 0.0006 | 0.7 | 1.13 | 0.0010 | 1.3 | Comparative Example 8 |

TABLE 6

| Steel type | Surface properties | Amount of diffusible hydrogen [ppm] | CIE [Nm] | Impact resistance | Remark |
| --- | --- | --- | --- | --- | --- |
| H | Poor | 0.120 | 39,077 | Good | Comparative Example 6 |
| A | Good | 0.133 | 39,557 | Good | Inventive Example 9 |
| A | Good | 0.042 | 40,456 | Good | Inventive Example 10 |
| A | Good | 0.197 | 35,817 | Good | Inventive Example 11 |
| A | Good | 0.268 | 31,805 | Poor | Comparative Example 7 |
| A | Good | 0.198 | 39,867 | Good | Inventive Example 12 |
| F | Good | 0.260 | 29,854 | Poor | Comparative Example 8 |

As shown in Tables 4 to 6, it was confirmed that in Comparative Example 6 in which the content of Sb of the present disclosure was not satisfied and the product of the acid concentration and the pickling time was less than 800 g/L*s, Relational Expressions 1-1, 1-2, 2-1, and 2-2 were not satisfied, and the hot scale was not completely removed and was highly likely to cause surface defects during post-processing.

In Comparative Examples 7 and 8 in which the product of the acid concentration and the pickling time was more than 10,000 g/L*s, since all of Relational Expressions 1-1, 1-2, 2-1, and 2-2 were not satisfied, the amount of diffusible hydrogen in steel was high, and thus the hydrogen brittleness resistance was deteriorated, and at the same time, the CIE value, which was the impact resistance index, was also low, and thus the impact resistance was also deteriorated.

On the other hand, in Inventive Examples 9 to 12, since the steel composition of the present disclosure satisfied the range of the present disclosure and the product of the acid concentration and the pickling time was within the range of 800 to 10,000 g/L*s, Relational Expressions 1-1, 1-2, 2-1, and 2-2 satisfied the ranges of the present disclosure. Therefore, the surface properties were excellent, and the hydrogen brittleness resistance was also excellent because the amount of diffusible hydrogen in steel was reduced. In addition, the CIE value, which was the impact resistance index, was increased, and thus the impact resistance was excellent.

Experimental Example 3

A specimen was manufactured in the same manner as that of Experimental Example 1, except that the slab was manufactured by soft reduction with the total reduction ratio shown in Table 7 before reheating the slab, and the conditions shown in Table 7 were applied. Each of the properties of the specimen was evaluated in the same manner as that of Experimental Example 1, and additionally, the thickness of the Mn segregation band in the steel sheet and the content of Sb in the Mn segregation band were measured for the plated steel sheet and the hot press formed member. The measurement results are shown in Table 7.

Figure 6B:
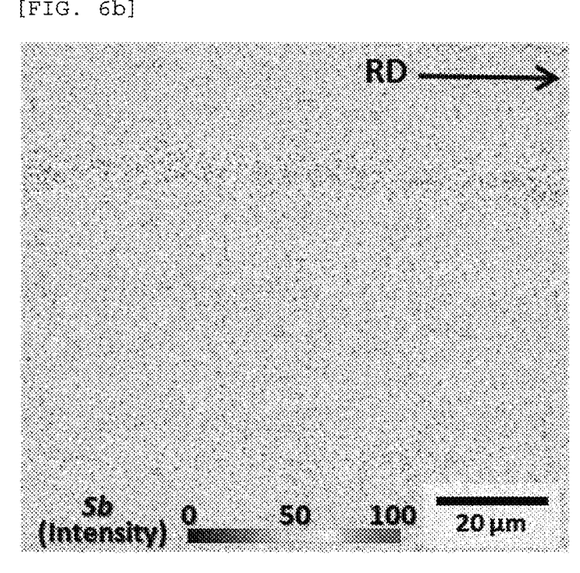

In particular, the thickness of the Mn segregation band and the area where the average content of Sb in the Mn segregation band was 1.015 times or more the average content of Sb in the base steel sheet were measured by applying the method described in the present specification using an electron probe X-ray micro-analyzer (EPMA) method. The Mn and Sb element mapping results are illustrated in FIGS. 6A and 6B, respectively.

At this time, the surface properties, the amount of diffusible hydrogen, and the impact resistance were measured in the same manner as described above.

In addition, in order to evaluate the bendability, a bending test was performed in the member manufactured by each of Inventive Examples and Comparative Examples shown in Table 7. Specifically, when a ratio of the fracture surface was observed by measuring the region corresponding to 100 μm below from the surface with an SEM, the ductile fracture and the cleavage fracture occurred. At this time, it was indicated as "o" when the area ratio of the ductile fracture to the total measured area was 70% or more, and as "x" when the area ratio of the ductile fracture to the total measured area was less than 70%.

TABLE 7

| Steel type | Total reduction ratio during casting | Annealing condition Annealing temperature [° C.] | Annealing condition Dew point temperature [° C.] | Hot press forming temperature [° C.] | HCl concentration [g/L] | Pickling time [s] | HCl concentration* pickling time [g/L*s] | Remark |
|---|---|---|---|---|---|---|---|---|
| M | 0.40% | 850 | −30 | 900 | 200 | 20 | 4,000 | Inventive Example 13 |
| M | 0.52% | 800 | −40 | 920 | 190 | 22 | 4,180 | Inventive Example 14 |
| M | 0.70% | 770 | −20 | 900 | 220 | 18 | 3,960 | Inventive Example 15 |
| M | 4.10% | 750 | −30 | 880 | 180 | 23 | 4,140 | Inventive Example 16 |
| N | 1.30% | 800 | −20 | 890 | 220 | 21 | 4,620 | Comparative Example 9 |
| N | 6% | — | — | — | — | — | — | Comparative Example 10 |

TABLE 8

| Steel type | [Relational Expression 1-1] $Sb_{max}/Sb_{coat}$ of plated steel sheet | [Relational Expression 1-2] P1 of plated steel sheet ; $(Sb_{max} - Sb_{coat})/ 2 \times \Delta t$ [% * µm] | [Relational Expression 2-1] $Sb_{max}/Sb_{coat}$ member ; | [Relational Expression 2-2] P1 of member; $(Sb_{max} - Sb_{coat})/ 2 \times \Delta t$ [% * µm] | Remark |
|---|---|---|---|---|---|
| M | 2.12 | 0.0156 | 2.07 | 0.0171 | Inventive Example 13 |
| M | 2.01 | 0.0135 | 1.95 | 0.0178 | Inventive Example 14 |
| M | 1.88 | 0.0126 | 1.89 | 0.0170 | Inventive Example 15 |
| M | 1.80 | 0.0125 | 1.81 | 0.0164 | Inventive Example 16 |
| N | 1.18 | 0.0065 | 1.45 | 0.0095 | Comparative Example 9 |

TABLE 9

| Steel type | thickness in plated Mn segregation band steel sheet [µm] | Ma* | Mn segregation band thickness in member [µm] | Mb* | Remark |
|---|---|---|---|---|---|
| M | 20.8 | 56.9 | 16.7 | 58.5 | Inventive Example 13 |
| M | 18.9 | 61.3 | 15 | 64.7 | Inventive Example 14 |
| M | 15.4 | 67.7 | 12.0 | 70.9 | Inventive Example 15 |
| M | 8.8 | 72.8 | 7.5 | 75.1 | Inventive Example 16 |
| N | 6.7 | 77.6 | 5.5 | 80.1 | Comparative Example 9 |

Ma*: In the plated steel sheet, the area where the average content of Sb in the Mn segregation band is 1.015 times or more the average content of Sb in the base steel sheet
Mb*: In the hot press formed member, the area where the average content of Sb in the Mn segregation band is 1.015 times or more the average content of Sb in the base steel sheet

TABLE 10

| Steel type | Surface properties | Amount of diffusible hydrogen [ppm] | CIE [Nm] | Bendability | Remark |
|---|---|---|---|---|---|
| M | Good | 0.199 | 32,481 | X | Inventive Example 13 |
| M | Good | 0.182 | 34,950 | ○ | Inventive Example 14 |
| M | Good | 0.177 | 36,056 | ○ | Inventive Example 15 |
| M | Good | 0.179 | 37,905 | ○ | Inventive Example 16 |
| N | Good | 0.266 | 31,954 | X | Comparative Example 9 |

As shown in Tables 7 to 10, in Comparative Example 9, the content of Sb added was less than the range of the present disclosure, and in addition, Sb in the Mn segregation band was not sufficiently concentrated, resulting in deterioration of the impact resistance.

In the case of Comparative Example 10, since the total reduction ratio during continuous casting was more than 5%, casting was not possible due to failure of the casting reducing machine, and thus, the experimental evaluation was not possible.

On the other hand, in Inventive Examples 13 to 16, the ranges of Relational Expressions 1-1, 1-2, 2-1, and 2-2 were satisfied, and thus the surface properties were excellent, and the hydrogen brittleness resistance was excellent due to a small amount of diffusible hydrogen.

In particular, among Inventive Examples described above, in the cases of Inventive Examples 14 to 16 in which in the plated steel sheet, the thickness of the Mn segregation band satisfied 20 µm or less (or in the hot press formed member, the thickness of the Mn segregation band was 15 µm or less), or in the plated steel sheet and the hot press formed member, the ratio of the average content of Sb in the Mn segregation band to the average content of Sb in the base steel sheet satisfied 60% or more, it was confirmed that the bendability was further improved compared to Inventive Example 13 in which one or more of the conditions described above were not satisfied and Comparative Example 9 in which all of the conditions described above were not satisfied.

It may be appreciated from the experimental examples described above that according to the present disclosure, hot press formed products having excellent impact resistance as well as resistance to hydrogen delayed fracture due to a reduction in amount of diffusible hydrogen even with a small amount of Sb added in steel may be manufactured, and these parts may be applied and used in various fields including the automobile manufacturing field as structural materials or reinforcing parts.

1: Plating layer
2: Sb-rich layer
21: Sb content increase section in x-axis (+) direction in Sb-rich layer
22: Sb content increase section in x-axis (−) direction in Sb-rich layer
3: Base steel sheet
10: Sb average content line of plating layer
11: Last contact point of Sb average content line and Sb content line by GDS of plating layer in x-axis (+) direction
30: Sb average content line of base steel sheet
31: Last contact point of Sb average content line and Sb content line by GDS of base steel sheet in x-axis (−) direction
100: Sb content line by GDS
200: In Sb-rich layer, point where content of Sb is maximum value

The invention claimed is:

1. A plated steel sheet for hot press forming comprising:
a base steel sheet containing, by wt %, 0.14 to 0.5% of C, 0.001 to 1% of Si, 0.3 to 4% of Mn, 0.001 to 0.015% of P, 0.0001 to 0.02% of S, 0.001 to 0.1% of Al, 0.001 to 1% of Cr, 0.001 to 0.02% of N, 0.1% or less of Ti, 0.01% or less of B, 0.005 to 0.1% of Sb, and a balance of Fe and unavoidable impurities;
an aluminum or aluminum alloy plating layer provided on at least one surface of the base steel sheet; and
a Sb-rich layer provided between the base steel sheet and the plating layer,
wherein the plated steel sheet for hot press forming satisfies the following Relational Expressions 1-1 and 1-2:

[Relational Expression 1-1]

$$\frac{Sb_{max}}{Sb_{coat}} \geq 1.2$$

[Relational Expression 1-2]

$$\frac{(Sb_{max} - Sb_{coat})}{2} \times \Delta t \geq 0.008$$

[in Relational Expressions 1-1 and 1-2, $Sb_{coat}$ represents an average content of Sb in the plating layer, and a unit thereof is wt %, $Sb_{max}$ represents a maximum value of a content of Sb in the Sb-rich layer, and a unit thereof is wt %, and $\Delta t$ represents a linear distance from a boundary between the plating layer and the Sb-rich layer to a point where $Sb_{max}$ is measured, and a unit thereof is μm].

2. The plated steel sheet for hot press forming of claim 1, wherein a thickness of the Sb-rich layer is 1 μm or more and 20 μm or less.

3. The plated steel sheet for hot press forming of claim 1, wherein the base steel sheet includes a Mn segregation band, and
an area where an average content of Sb in the Mn segregation band is 1.015 times or more the average content of Sb in the base steel sheet is 60% or more.

4. The plated steel sheet for hot press forming of claim 3, wherein a thickness of the Mn segregation band is 20 μm or less.

* * * * *